July 9, 1929.　　　H. P. MacGREGOR　　　1,720,523
LUBRICATED PLUG VALVE
Filed March 2, 1928
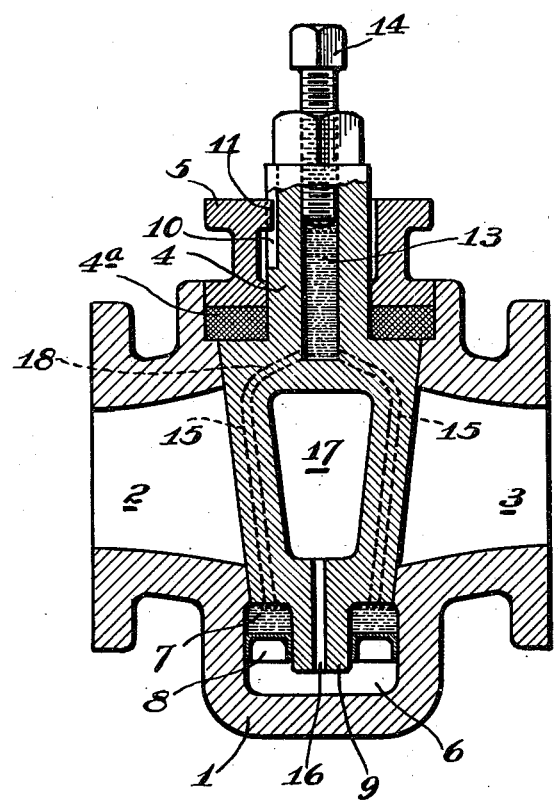
INVENTOR
Halbert P. MacGregor
James C. Bradley
atty Patented July 9, 1929.

1,720,523

UNITED STATES PATENT OFFICE.

HALBERT P. MacGREGOR, OF CLAYTON, MISSOURI, ASSIGNOR TO MacGREGOR VALVE COMPANY, OF ST. LOUIS, MISSOURI, A CORPORATION OF MISSOURI.

LUBRICATED PLUG VALVE.

Application filed March 2, 1928. Serial No. 258,542.

The invention relates to plug valves of the type having fluid pressure means for loosening the plug in case it sticks. It has for its principal objects, the provision of an improved valve of the type specified, which is completely lubricated at all times; in which a high degree of economy is secured in the use of lubricant; and in which the fluid pressure of the line in which the valve is located is utilized to give the feed of lubricant, thus insuring a substantially uniform feed pressure, and a correspondingly uniform flow of the lubricant until the supply is exhausted. One embodiment of the invention is shown in the accompanying drawings, wherein:

The figure is a section through the valve.

Referring to the drawing, the numeral 1 designates the valve casing or body provided with a tapering bore and with a transverse passage 2; and 3 is the plug tapered to fit the bore of the casing and having a stem 4 for the application of a handle or turning tool. Opposite the upper end of the plug is a gasket 4ª of yielding material pressed down by means of the cover plate 5, such cover plate being secured to the body by means of bolts (not shown). Opposite the lower end of the plug is a chamber 6 partially filled with a body of lubricant 7. This lubricant is confined on its lower side by means of a plunger 8, such plunger being of annular form and surrounding the extension 9 at the lower end of the plug. The plunger has a relatively close machine fit at its flanges with the extension 9 and with the wall of the chamber 6. The stem 4 of the plug is provided with a slot 10 extending around about 90 degrees of its circumference, which slot is engaged by a projection 11 on the cover plate 5 and serves as a stop means for limiting the rotary movement of the plug.

The stem of the plug is provided with a lubricant chamber 13 into the upper end of which extends the feed screw 14. The lower end of the chamber 13 communicates with a pair of radial passages 14 in the plug, which passages in turn communicate at their outer ends with grooves 15, 15 (two or four in number) lying between the plug and the bore of the casing, such grooves being preferably cut out of the material of the casing. A passage 16 provides a communication from the port 17 leading through the plug to the chamber 6 on the lower side of the plunger 8.

The chamber 13 is charged with lubricant by means of a grease gun or other suitable device applied to the upper end of the chamber or by the screw 14, the lubricant thus supplied flowing down through the passages 14 and 15 to the space in the chamber 6 lying above the plunger 8. During the operation of the valve, the line pressure inside the body which is communicated to the port 17 when the plug is in open position, supplies fluid pressure through the passage 22 behind the plunger 8, thus tending to move the plunger upward and force the supply of grease in the chamber 7 through the grooves 15, 15. This feed of lubricant is uniform and constant until the plunger forces out all of the lubricant in the chamber 7, when it is necessary to recharge the chamber as heretofore explained. In case the plug becomes stuck in position after a period of disuse, it may be readily loosened by screwing in the member 14 so that sufficient fluid pressure is applied in the chamber 6 to lift the plug slightly. The gasket 4ª resists this upward movement, but its resistance is of a yielding character because of its composition so that when sufficient pressure is supplied at the lower end of the plug, it can move up sufficiently to free it. The upward movement of the plug will in most cases be preceded by a downward movement of the plunger 8, until it engages the bottom of the chamber 6, after which the positive force applied to the lubricant becomes effective to free the plug. The construction, therefore, provides both for a constant, uniform feed of lubricant and for the freeing of the valve in case it should become stuck in position. The invention is not limited in its application to valves having tapering bores and plugs, although this is the preferred construction.

What I claim is:

1. In combination in a valve, a casing or body having a tapering bore therein with a transverse passage for fluid, and having a lubricant chamber at the smaller end of the bore, a tapering valve plug fitting the bore so that its end constitutes the end of said chamber, a plunger fitting in the chamber, and means for feeding lubricant under pressure lengthwise of the plug to said chamber in front of said plunger, a passage being provided whereby line pressure is communicated from the interior of the valve body to said chamber at a point behind said plunger.

2. In combination in a valve, a casing or body having a bore therein with a transverse passage for fluid, and having a lubricant chamber at the inner end of the bore, a valve plug fitting the bore with its inner end positioned so that it constitutes one end of said chamber, a plunger fitting in the chamber in opposition to said end of the plug, means for yieldingly holding the plug against outward movement in said bore, and means for feeding lubricant lengthwise of the plug under pressure into said chamber between the end of the plug and the plunger to fill the chamber and also to move the plug endwise in the bore in case it is stuck in position, a communication being provided from the interior of the casing through the plug to the chamber at a point behind the plunger so that the line pressure is applied thereto tending to feed lubricant from the chamber, and a lubricating groove being provided between the bore and the plug leading from the lubricant chamber.

3. In combination in a valve, a casing or body having a tapering bore therein with a transverse passage for liquid, and having a lubricant chamber at the small end of the bore, a tapering valve plug fitting the bore with its inner end positioned so that it constitutes one end of said chamber, a plunger fitting in the chamber in opposition to said small end of the plug, means for yieldingly holding the plug against outward movement in the bore, means for feeding lubricant lengthwise of the plug under pressure into said chamber between the end of the plug and the plunger to fill the chamber and also to move the plug endwise in the bore in case it is stuck in position, a communication being provided from the interior of the casing through the plug to the chamber at a point behind the plunger so that line pressure is applied thereto tending to feed lubricant from the chamber, and a lubricant groove being provided between the bore and plug leading from the lubricant chamber.

In testimony whereof, I have hereunto subscribed my name this 28th day of February, 1928.

HALBERT P. MacGREGOR.